United States Patent [19]

Baker et al.

[11] Patent Number: 4,926,316

[45] Date of Patent: May 15, 1990

[54] MEMORY MANAGEMENT UNIT WITH OVERLAPPING CONTROL FOR ACCESSING MAIN MEMORY OF A DIGITAL COMPUTER

[75] Inventors: Paul A. Baker, Los Altos; Gary L. Marten, Cupertino, both of Calif.

[73] Assignee: Apple Computer, Inc., Cupertino, Calif.

[21] Appl. No.: 933,071

[22] Filed: Dec. 17, 1986

Related U.S. Application Data

[63] Continuation of Ser. No. 426,869, Sep. 29, 1982, abandoned.

[51] Int. Cl.$^5$ .............................................. G06F 9/00
[52] U.S. Cl. ............................... 364/200; 364/238.4; 364/246; 364/246.3; 364/246.4; 364/246.5; 364/245.4
[58] Field of Search .............................. 364/200, 900

[56] References Cited

U.S. PATENT DOCUMENTS

| | | | |
|---|---|---|---|
| 3,828,327 | 8/1974 | Berglund et al. | 340/172.5 |
| 3,902,163 | 8/1975 | Amdahl et al. | 340/172.5 |
| 4,004,278 | 1/1977 | Nagashima | 340/172.5 |
| 4,037,215 | 7/1977 | Birney et al. | 364/200 |
| 4,084,224 | 4/1978 | Appell et al. | 364/200 |
| 4,084,227 | 4/1978 | Bennett et al. | 364/200 |
| 4,084,228 | 4/1978 | Dufond et al. | 364/200 |
| 4,096,568 | 6/1978 | Bennett et al. | 364/200 |
| 4,104,718 | 8/1978 | Poublan et al. | 364/200 |
| 4,130,867 | 12/1978 | Bachman et al. | 364/200 |
| 4,297,743 | 10/1981 | Appell et al. | 364/200 |
| 4,316,245 | 2/1982 | Luu et al. | 364/200 |
| 4,354,225 | 10/1982 | Frieder et al. | 364/200 |
| 4,376,297 | 3/1983 | Anderson et al. | 364/200 |
| 4,378,591 | 3/1983 | Lemay | 364/200 |
| 4,410,941 | 10/1983 | Barrow et al. | 364/200 |
| 4,424,561 | 1/1984 | Stanley et al. | 364/200 |

FOREIGN PATENT DOCUMENTS

| | | |
|---|---|---|
| 0040702 | 2/1981 | European Pat. Off. . |
| 190324 | 12/1982 | New Zealand . |
| 1413739 | 11/1975 | United Kingdom . |
| 1477977 | 6/1977 | United Kingdom . |
| 1487078 | 9/1977 | United Kingdom . |
| 1498116 | 1/1978 | United Kingdom . |
| 1547382 | 6/1979 | United Kingdom . |
| 1557121 | 12/1979 | United Kingdom . |
| 1577592 | 10/1980 | United Kingdom . |
| 1585960 | 3/1981 | United Kingdom . |
| 2073458 | 2/1984 | United Kingdom . |

OTHER PUBLICATIONS

Wescon Conference Record, vol. 25, Sep. 1981, pp. 1–9, El Segundo, U.S.; S. Walters: "Memory Management Made Easy with the Z8000".

Electronic Design, vol. 29, No. 17, Aug. 1981, pp. 115–121, Waseca, MN, U.S.; D. L. Collins et al.: "Memory Management Chip Masters Large Data Bases".

Electronics International, vol. 54, No. 11, Jun. 1981, pp. 134–138, New York, U.S.; J. Beekmans et al.: "Chip Set Bestows Virtual Memory on 16-bit Minis".

Primary Examiner—Gareth D. Shaw
Assistant Examiner—John G. Mills
Attorney, Agent, or Firm—Blakely, Sokoloff, Taylor & Zafman

[57] ABSTRACT

An improved memory management unit (MMU) for interfacing between a CPU and a main computer memory. The MMU receives logical addresses from the CPU and converts a portion of the logical address to be used for generating a physical address to address to address the main memory. The MMU memory contains relocation data which is stored in a plurality of segments known as contexts. For a given logical address provided by the CPU, the CPU also selects an appropriate context so that the mapping of the main memory is determined by the selected relocation base. This permits relocation data to be stored for a plurality of processes and thus, allows several programs to be run without reprogramming the MMU. Special "limit" bits and "access" bits are also stored in the MMU's memory for each of the relocation base data. The limit bits are used to check the range of the memory area requested for a given context to determine if it is in the allowable range. Access bits are used to determine if the type of access being requested is a legal access for the given context. Because the MMU stores a number of relocation bases which are programmable by the CPU, areas of main memory can be accessed by more than one context, thereby providing an overlapped mapping of the main memory. For example, in a supervisory mode the supervisory context is able to access all of the main memory.

5 Claims, 3 Drawing Sheets

MEMORY MANAGEMENT UNIT WITH OVERLAPPING CONTROL FOR ACCESSING MAIN MEMORY OF A DIGITAL COMPUTER

This is a continuation of application Ser. No. 426,869 filed Sept. 29, 1982.

BACKGROUND OF THE INVENTION

1. Field of the Invention.

The invention relates to the field of computer memories and units for managing the contents of such memories.

2. Prior Art

In most computers, a central processing unit (CPU) communicates directly with both an address bus and a data bus. These buses are coupled to a main memory (or main memory systems) in addition to numerous other items such as input/output ports, specialized processors, DMA units, etc. The main computer memory is often the most expensive component of the computer, particularly when compared to the price of currently available microcomputer CPUs such as the 8080, 8086, 6800 and 68000. Thus, it is important to efficiently utilize the computer's main memory.

Memory management units (MMUs) are used in the prior art to provide efficient utilization of the computer's main memory. These units perform housekeeping functions such as remapping, etc. Often, an MMU includes a memory which stores a data relocation base. The higher order bits of the logical address from the CPU are used to address the MMU's memory. These bits from the CPU's standpoint, for instance, select a segment of the main memory. The selected CPU segment number is replaced by a new number from the MMU's memory and effectively, a relocation occurs between the logical address from the CPU and the physical address used to access the main memory.

Another function performed by prior art MMUs is to check addresses from the CPU to verify that they fall within certain ranges. A limit number stored in the MMU's memory is compared with lower order bits of the logical address (for example, the page offset) to assure that the page offset falls within a predetermined address range of the selected segment number. This prevents, by way of example, the accidental reading of "data" from memory locations where data has not been placed.

The present invention builds upon those prior art MMUs which provide a relocation base and address range verification. As will be seen, the MMU's memory is expanded in one direction to store signals representing the nature of information stored in the main memory. This is used to control access of the main memory and, by way of illustration, prevents accidental writing into programs and user access to operating systems. The MMU's memory is expanded in another direction so that overlapping memory management is provided. This allows several different processes (program and data) to be run by the computer without reprogramming the MMU memory.

SUMMARY OF THE INVENTION

An improved memory management unit (MMU) is described for use with a computer which includes a central processing unit (CPU) and a main memory. The MMU includes a relocation base and when receiving first address signals from the CPU, provides second address signals for accessing the memory. The MMU also includes storage means for receiving and storing signals representative of the types of information stored in locations in the main memory. Accessing means are provided for accessing these stored signals when the corresponding locations are accessed in the main memory. The stored signals from the storage means are coupled to the main memory to, for example, limit access of certain types of data in the memory such as operating systems. The signals may be also used to permit reading-only of programs, and reading and writing of data.

In the presently preferred embodiment, the storage means is an integral part of the MMU's memory. The MMU's memory has four times the capacity than is needed to provide relocation base numbers and limit numbers for the entire main memory. As will be described, this additional capacity permits a form of "bank switching" and allows different processes to be run on the computer without reprogramming of the MMU memory.

DETAILED DESCRIPTION OF THE INVENTION

A memory management unit (MMU) is described for use in a digital computer which includes a central processing unit (CPU) and a main memory. In the following description, numerous specific details are set forth such as specific memory sizes, part numbers, etc., in order to provide a thorough understanding of the present invention. However, it will be obvious to one skilled in the art that these specific details are not required to practice the present invention. In other instances, well-known structures and circuits are not described in detail in order not to obscure the present invention in unnecessary detail.

Figure 1:
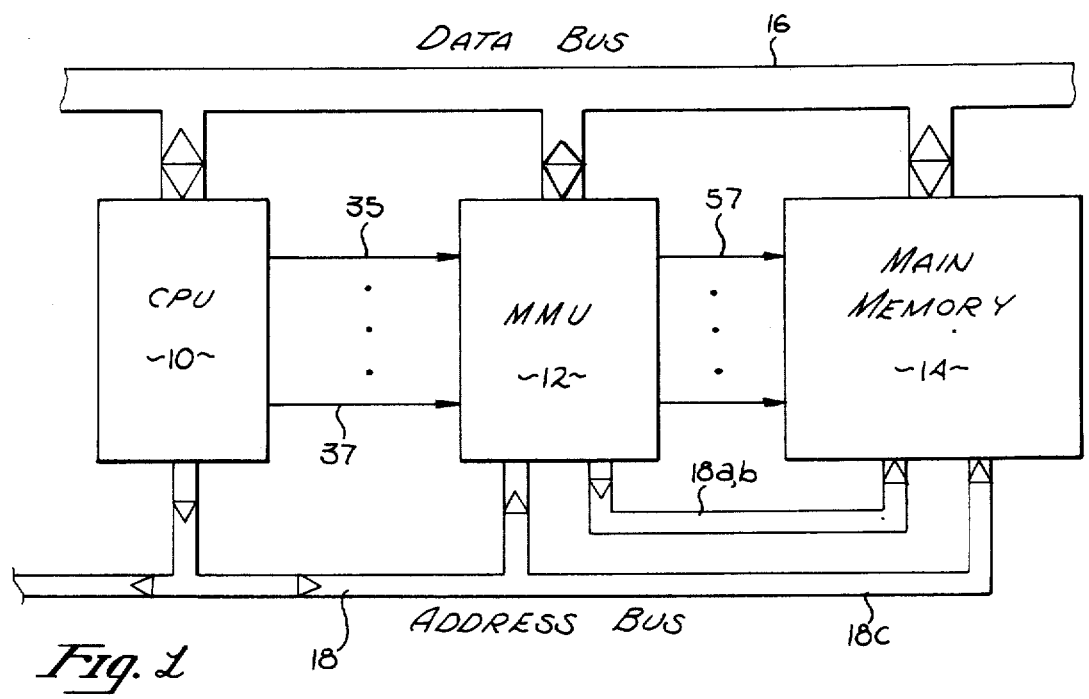
FIG. 1 is a general block diagram illustrating a central processing unit, memory management unit (MMU) and main memory and their interconnections in a computer.

Referring first to FIG. 1, the coupling between an MMU, CPU and main memory is illustrated This coupling is somewhat the same for the present invention as it is for the prior art. The computer of FIG. 1 includes a bidirectional data bus 16 which communicates with the CPU 10, main memory 14 and the MMU 12. The address bus 18 receives address signals from the CPU 10 and communicates part of these addresses to the MMU 12 and part to the main memory 14. Other control signals are coupled between the CPU 10 and MMU 12 as illustrated by lines 35 and 37 and between the MMU 12 and the main memory 14 as shown by line 57.

The MMU 12 is programmed from the CPU 10 through the data bus 16. Addresses are communicated over the bus 18 to the MMU from the CPU 10 to allow the loading of the MMU 12.

In the presently preferred embodiment, the CPU 10 comprises a 68000 processor. For this processor, the CPU 10 provides 24 bit addresses (Actually, the lowest order bit is not physically present as such but encoded into other signals, however, for purposes of discussion, it will be assumed to be an ordinary address bit.) Also, for purposes of discussion, it will be assumed that the 7 highest order bits of each logical address from the CPU selects a segment in memory, the next 8 lesser significant bits comprise a page offset, and the least significant 9 bits, an offset.

In the presently preferred embodiment, the segment and page offset of each address are coupled to the MMU 12. The MMU provides a relocation base by exchanging the segment number from the CPU 10 with a segment number stored in the MMU 12. Specifically, the segment number from the CPU 10 addresses a memory within the MMU 12 and this memory provides a segment base used to address the main memory 14. The page offset portion of the address from the CPU 10 is checked to determine if the page offset falls within a predetermined range of the segment. This, for instance, would prevent the reading and interpreting as data, all zeros from an unused space in main memory. The segment base from the MMU along with the page offset are added and then coupled to the main memory 14 on the bus 18a and 18b of FIG. 1.

The 9 least significant bits are passed directly from the CPU to the main memory via bus 18c.

Figure 2:
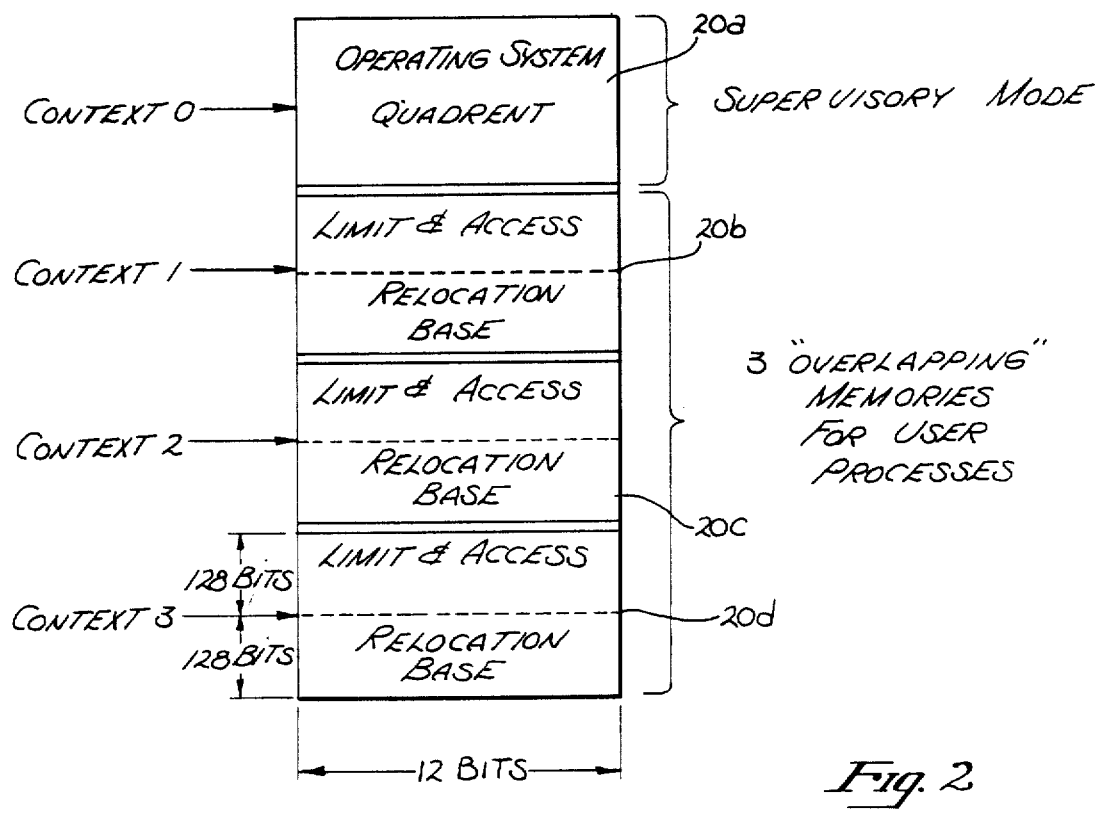
FIG. 2 is a diagram illustrating the organization of data stored in the memory of the invented MMU.
Figure 3:
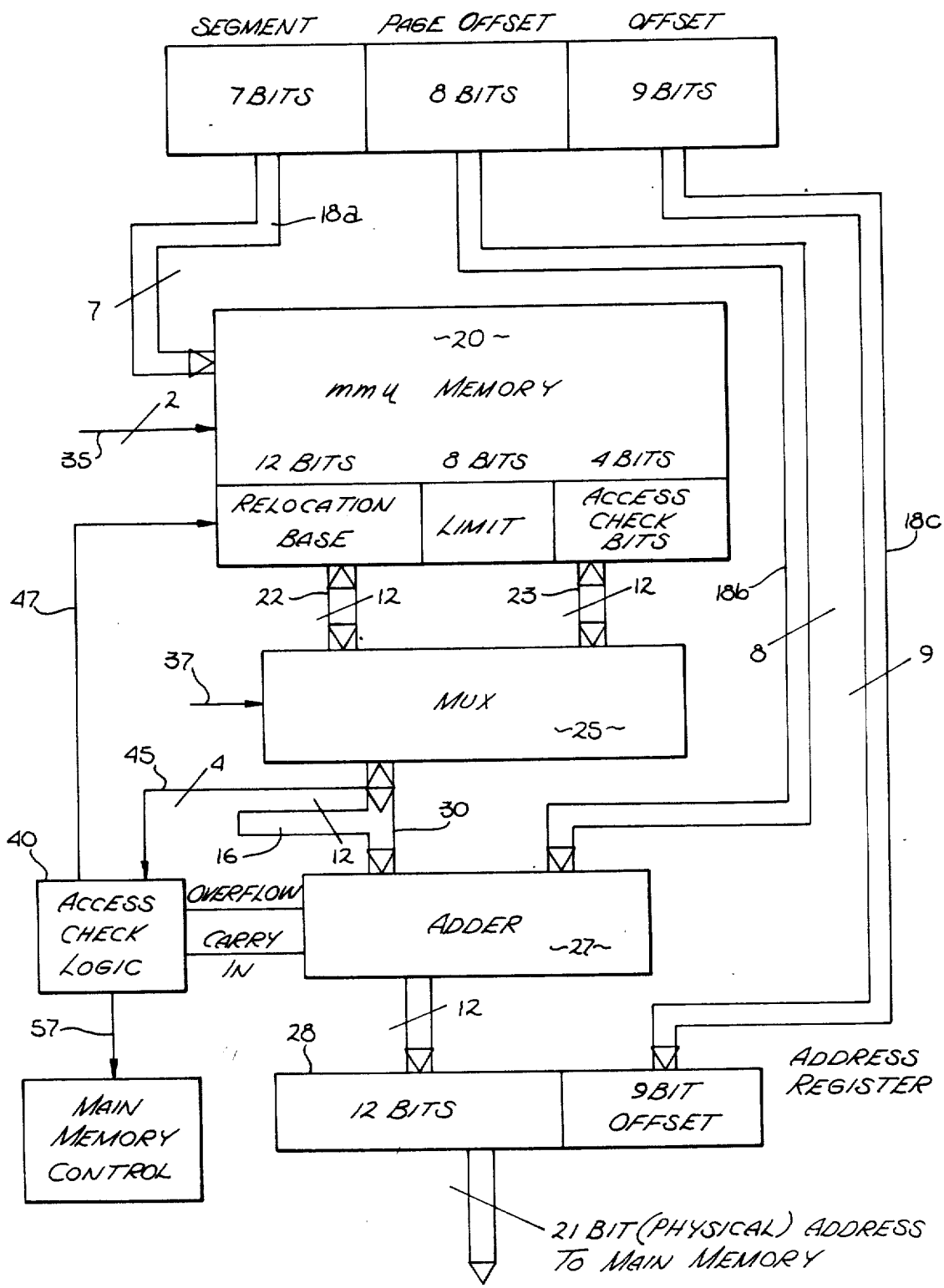
FIG. 3 is a block diagram of the invented MMU.

Referring now to FIG. 3, the presently preferred embodiment of the MMU includes an MMU memory 20. This memory is a random-access memory fabricated from commercially available MOS static RAMs. As currently implemented, three Part No. 2148 RAMs are used for memory 20, thus providing a total capacity of 12k bits. The organization of the MMU memory is discussed in greater detail, particularly in conjunction with FIG. 2.

The address from the CPU is shown as the 24 bit address (logical address) in the uppermost part of FIG. 3. The 7 most significant bits of this address are coupled to the MMU's memory via bus 18a and are used to address the MMU's memory. The next most significant bits (bus 18b) are coupled to an adder 27, and the least significant 9 bits (offset) are coupled via bus 18c to register 28. The output of the MMU's memory 20 consists of two 12-bit words (buses 22 and 23). These words are coupled through the multiplexer 25 to the 12-bit bus 30. One of the 12 bit words from the memory 20 provides the segment base from the stored relocation base. The second 12 bits consist of 8 bits for limit checking of the page offset and 4 additional bits which perform functions which are part of the present invention.

(In the presently preferred embodiment, multiplexer 25 does not physically exist, rather the output of memory 20 is time division multiplexed. However, for purposes of explanation it is easier to include the multiplexer 25.)

The multiplexer 25 is also used to load information from the bus 16 into the memory 20. The signal on line 47 from the access check logic 40 provides access to the memory 20 as do the signals on line 35. The signal on line 37 controls the multiplexing of data between either the bus 22 or the bus 23.

The 12 bit bus 30 from the multiplexer 25 is coupled to the adder 27. This adder also receives the 8 bits on bus 18b. As will be described, the adder 27 is used to determine if the page offset falls within a predetermined range of the selected segment. The adder 27 also combines the relocation (segment base) from the MMU's memory with the page offset to provide the 12 most significant bits of the physical address These 12 bits along with the 9 bits from bus 18c are coupled to the register 28 to provide a 21 bit address which is communicated to the main memory 14. (The register 28 does not exist in the presently preferred embodiment, it is shown for purposes of explanation).

The 4 access check bits are coupled from the multiplexer 25 via line 45 to the access logic 40. Here the signals are decoded to provide main memory control and other control as follows: One bit controls the type of main memory access (1=read only, 0=read/write). The second bit controls I/o access (1=4I/o, 0 =no I/o access). The third bit controls main memory access (1=memory access, 0=no main memory access). The fourth bit controls stacking (1=stack segment - check for no overflow, 0=normal segment - check for overflow). The access check logic 40 is shown in FIG. 3 coupled to the main memory control via line 57 to control memory access and the type of accesses permitted (i.e., read or read/write). Logic 40 is coupled to adder 27 via the overflow/carry in lines and to memory 20 via line 47 to enable memory 20 access.

The specific access control bit pattern used in the presently preferred embodiment is shown below.

| | ACCESS CONTROL BITS | | | |
|---|---|---|---|---|
| MEM/ BITS | IO/ | RO/ | STK/ | ADDRESS SPACE AND ACCESS |
| 0 | 1 | 0 | 0 | Main Memory - Read Only Stack |
| 0 | 1 | 0 | 1 | Main Memory - Read Only |
| 0 | 1 | 1 | 0 | Main Memory - Read/Write Stack |
| 0 | 1 | 1 | 1 | Main Memory - Read/Write |
| 1 | 0 | 0 | 1 | I/O Space |
| 1 | 1 | 0 | 0 | Page Invalid (segment not present) |
| 1 | 1 | 1 | 1 | Special I/O Space |
| Any other | | | | Not allowed (unpredictable result) |

Assume first that the memory 20 has been programmed from the CPU. For purposes of a first level explanation of the MMU's operation, the function of the 2 bits on lines 35 shall be ignored When the CPU addresses the main memory, the most significant 7 bits address the MMU's memory 20. The 12 bits from the relocation data segment are coupled via bus 22 and bus 30 to the adder 27. There they are combined with the page offset (bus 18b) and the resultant address is combined with the 9 bits of the offset in the register 28 to provide the final physical address. This portion of the MMU operates in a manner quite similar to prior art MMUs. Thus, the relocation segment base data can be programmed into the memory (ignoring line 35) in a manner well-known in the prior art.

The 12 bits forming the limit and access data are coupled via bus 23 through the multiplexer 25. The 8 bits of the limit data are coupled to the adder 27. The 4 bits of the access data are coupled to logic 40 via line 45 as discussed. The limit data in the presently preferred embodiment is stored in ones complement form in the memory 20 for a non-stacked segment. For stacked segments the limit stored is "length minus one" (e.g. a two page segment would be stored as 0000 0001 in memory 20.) When this limit data is added to the page offset in adder 27, the result of this addition determines whether or not the page offset falls within the predetermined range of the segment. This is an improvement over prior art limit checking where additional logic steps are required

NON-STACK EXAMPLE

Figure 4:
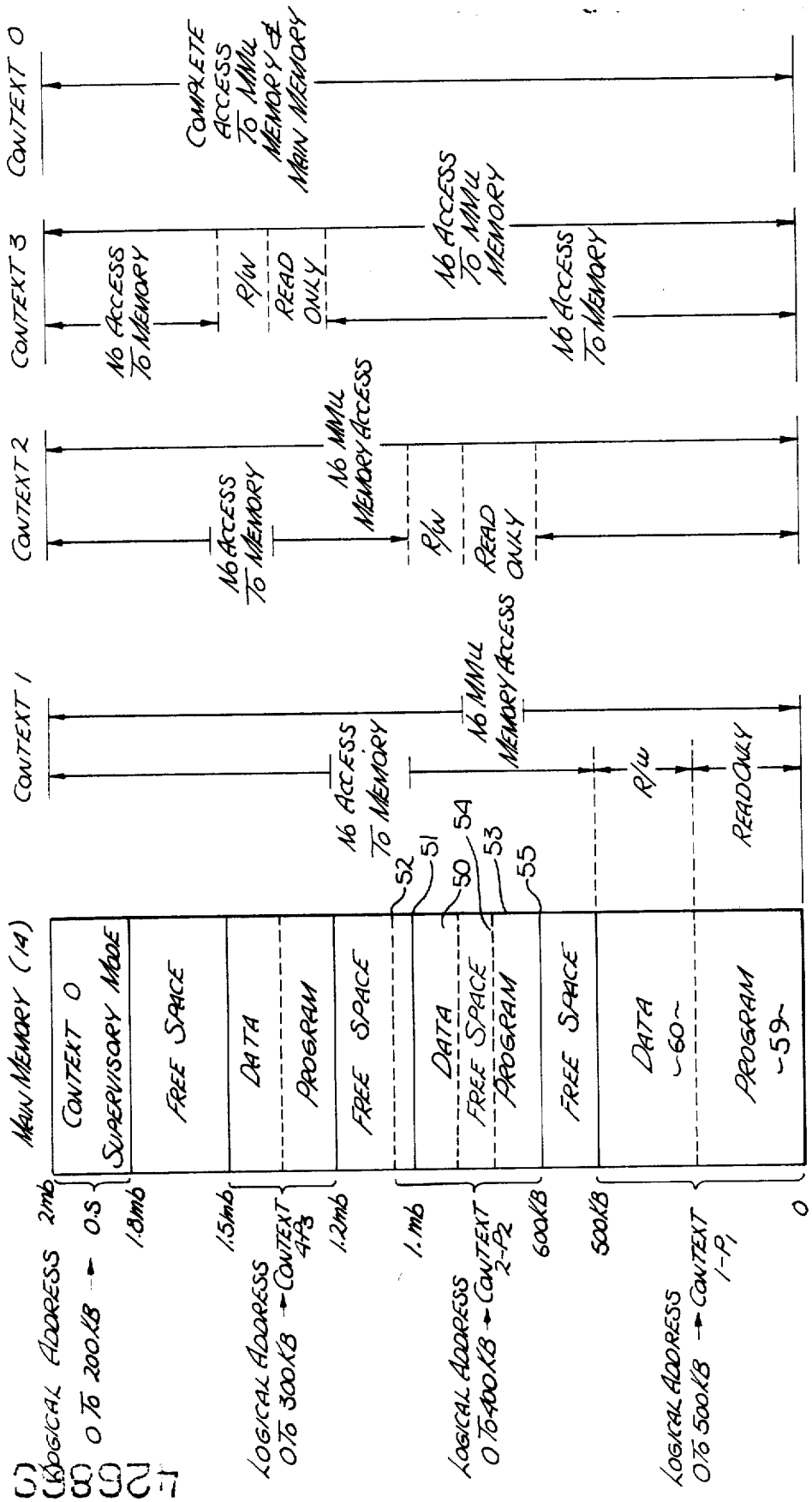
FIG. 4 is a diagram used to describe the different contexts used in the operation of the MMU and the resultant organization of information stored in the computer's main memory

Referring briefly to FIG. 4, a representation of the computer's main memory 14 is illustrated. Assume that data is stored at locations 50. Further assume that the highest page offset (1111 1111) for data 50 extends to location 52, and that within this segment data extends to a page offset of 1110 0000 (line 51). For this page offset, the ones complement of 1110 0000 (0001 1111) is stored in the memory 20 of FIG. 3. If this segment is addressed, and assuming the page offset address is 1111 1111 (that is, into the free space of the memory), adder 27 adds 1111 1111 to the stored number 0001 1111. An overflow occurs from the adder 27 and this overflow condition is sensed by the logic 40 of FIG. 3. For this example, an overflow indicates that the page offset is not within range and a signal is provided on line 57 to show that the address is in error. Logic 40 via line 57 prevents access to main memory and/or an error signal is generated.

Again referring to FIG. 4, assume that a program is stored at locations 53 and that the highest page offset (1111 1111) for program 53 extends to location 50 which is outside of the actual program which ends at location 54. If the page offset for location 54 is 0011 0000 then 1100 1111 is stored within the memory 20 of FIG. 3 for the segment which begins at location 55. If this segment is addressed and the page offset is 0000 0001, (addressing the program) the adder 27 adds 1100 1111 and 0000 0001. This time no overflow occurs and no signal is communicated to the logic 40, that is, access is permitted. Note that if the page offset is 0100 0000 (not within range) when this number is added to the stored number of 1100 1111 an overflow occurs. This overflow indicates to the logic 40 that the page offset is not in range and memory access is disabled.

STACK EXAMPLE

For some programming languages (e.g. Pascal) stacks (in memory) are very desirable. Stacks can be formed by moving data up in memory, albeit time consuming. Stacks with the presently described system are permitted to grow down in memory with a different limit checking procedure.

Assume a one page stack segment. The limit number stored in memory 20 as the one's compliment of the page offset (1111 1111→0000 0000) which is the same as the size minus one (0000 0000→0000 0000). The access check bits causes the logic 40 to provide a carry-in of one. If the page offset is 1111 1111, an overflow occurs. This overflow is sensed by logic 40, and interpreted as a valid (within range) condition. If the page offset were 1111 1110 (stack grown too much), no overflow occurs and this is interpreted as an out of range address.

Similarly, if the stack is a two page segment, 0000 0001 is stored in memory 20. Again the carry in is set to a one. A page offset of 1111 1110 would result in an overflow indicating an in range address, whereas with a page offset of 1111 1100 no overflow would occur, indicating an out of range address.

FIG. 4 EXAMPLE

Referring again to FIG. 4, assume that a process (program and data) is stored in the main memory 14 between the locations 0 and 500 KB. The 3 remaining access bits in the memory 20 corresponding to the segment addresses for locations 0-500 KB are used to provide special control, as mentioned. For instance, for those segments containing only program, only reading of the memory is allowed. This, of course, prevents the inadvertent writing into program. Both reading and writing into the segments which contain data may be permitted. This is indicated to the right of program 59 and data 60 in FIG. 4.

The memory 20 is programmed (i.e., access check bits) to prevent reading of some segments of the main memory except in certain modes (e.g., supervisory mode). This is done, for instance, to prevent a user from reading and then copying an operating system. Referring briefly to FIG. 4, when the program 59 is being run, no access to memory 20 is permitted since such access could cause the relocation base, limit data or access data to be inadvertently altered. Thus, the four access bits provide protection for the program stored within the main memory and also limit access to certain information stored in the memory. In a typical application, an operating system is loaded from a disk into the main memory. Once in the main memory, the CPU can access the operating system in supervisory modes, however, the user is prevented from accessing and hence copying the operating system.

With the present invention, the memory 20 has four times the capacity than is actually needed to provide a relocation base, and limit and access data for the main memory. The signals from the CPU on lines 35 allow the selection of each quadrant of the memory 20. Each of these quadrants are referred to as a context (context 0-3) in the following description.

Referring to FIG. 2, the organization of the MMU memory 20 is illustrated as four separate quadrants: 20a (context 0), 20b (context 1), 20c (context 2) and 20d (context 3). Context 1,2 and 3 are each organized in a 256×12 bit arrangement (128×12 bits for the relocation base and 128×12 bits for the limit and access data). Context 0 is selected by the CPU during the supervisory mode and this context stores management data relating to the operating system. It should be noted that each context is capable of storing information covering the entire main memory, thus there are three overlapping MMU memories for user processes.

The value of having these overlapping memories is best illustrated in FIG. 4. The main memory 14 is shown programmed with three processes, P1, P2 and P3. Process 1 is stored between 0 and 500 KB, process 2 between 600 KB and 1 mB and process 3 between 1.2 mB and 1.5 mB. Data relating to the operating system is stored between 1.8 mB and 2 mB. Assume first that the operating system is loaded into memory and is stored between 1.8 mB and 2 mB. An appropriate relocation base is stored within the memory 20 such that during supervisory modes, the addresses 0-200 KB automatically select 1.8 mB through 2 mB in the main memory. Also, the appropriate limits are loaded to assure that during the supervisory mode, the free space in the memory is not accessed. During the supervisory mode (context 0) as indicated in FIG. 4 under the heading context 0, complete access to the MMU memory and main memory is possible (except for access bits which prevent the writing into the operating system stored in main memory thereby protecting the program from damage due to a program error). Since the MMU memory is accessible at this time, it can be programmed through the bus 16 as indicated in FIG. 3, and as previously discussed.

Assume that context 1 is to be used for program 59 and data 60, one quadrant of the MMU's memory 20 corresponding to context 1 is programmed to indicate the location of program 59 and data 60. The limit and access bits are set as indicated under context 1. Thus, when context 1 is selected, program 59 can be read (only) and, reading and writing of data 60 is permitted. No other access to other memory locations is possible nor can the MMU memory be written into.

A second process can be stored in memory. The operating system knows the location of the first process and can program another quadrant of memory 20 for process 2. The relocation base is programmed such that when the CPU addresses locations corresponding to 0-400 KB, locations 600 KB to 1 mB, are provided to the main memory. As indicated under the heading context 2 in FIG. 4, the access bits are programmed to allow reading and writing into the data 50 and reading-only of the program 53. Also, no access (for writing) to the MMU memory is permitted, nor is access permitted to other locations in the main memory. Similarly, a third process can be stored in the main memory for context 4 as indicated in FIG. 4.

The advantage to the arrangement of FIG. 4 is that three separate processes are stored within the main memory and that each process may be easily selected through the MMU's memory, that is, by selecting context 1, 2 or 3. A separate context (context 0) is reserved as a starting point for the operating system, in the presently preferred embodiment, as discussed. This allows running of three separate programs without any reprogramming of the MMU's memory. This versatility is achieved because of the overlapping memory management capacity of the MMU's memory.

Thus, an improved memory management unit has been described which allows a plurality of programs to be run without reprogramming of the computer's MMU memory. The improved unit also limits access to certain types of data and prevents inadvertent writing into programs.

We claim:

1. In a computer system which includes a central processing unit (CPU and a computer main memory, a memory management unit (MMU) coupled to said CPU and said main memory for translating a logical address from said CFU to provide a physical address for accessing said main memory, comprising:

a MMU memory for storing a plurality of relocation base addresses, wherein said relocation base addresses are segmented into sections of memory (contests) such that each said context has at least one relocation base address associated therewith;

each said relocation base address having corresponding limit bits and access bits associated therewith, said limit bits and access bits also store said MMU memory;

said MMU receiving a control signal from said CPU for selecting a predetermined one of said contexts when said logical address is provided by said CPU;

said MMU memory for receiving a first portion of said logical address from said CPU and said first portion of said logical address accessing a stored relocation base address of a selected context and corresponding to said limit and access bits;

an adder coupled to said MMU memory for receiving said accessed relocation base address of said selected context and combining it with a second portion of said logical address to output said physical address for accessing said main memory;

said adder also coupled to receive said limit bits corresponding to said accessed relocation base address and adding it to said second portion of said logical address and generating an indication signal if said second portion of said logical address exceeds a value set by said limit bits;

access check logic means coupled to said MMU memory and said adder for receiving said access bits corresponding to said accessed relocation base address and determining if said access bits permit access of said main memory for a type of access requested by said CPU and generating a fault signal to prevent access of said main memory if an illegal access of said main memory is attempted;

said access check logic means also generating said fault signal if said indication signal is received from said adder;

each said relocation base address for pointing to a corresponding mapped base address in said main memory, such that a given logical address is mapped into a plurality of physical addresses, wherein at least one physical address is provided for each context; and wherein selected physical addresses of said main memory can be accessed by more than one context.

2. The MMU defined by claim 1 wherein one of said MMU memory contexts is selected as a supervisory context when said CPU is in a supervisory mode, such that said supervisory context accesses all of said main memory.

3. The MMU defined by claim 2 wherein said adder receives said limit number which is a binary complement of an offset from its relocation base address, such that when said binary complement is added to said second portion of said logical address said indication signal is generated when an overflow occurs from said adder.

4. The MMU defined by claim 3 wherein said MMU memory stores said relocation base addresses, said limit bits, and said access bits from said CPU during a MMU program cycle.

5. In a computer system which includes a central processing unit (CPU) and a computer main memory, a memory management unit (MMU) coupled to said CPU and said main memory for translating a logical address from said CFU to provide a physical address for accessing said main memory, an improvement comprising:

a MMU memory for storing a plurality of relocation base addresses, wherein said relocation base addresses are segmented into sections of memory (contexts) such that each said context has at least one relocation base address associated therewith;

each said relocation base address having corresponding limit bits and access bits associated therewith, said limit bits and access bits also stored in said MMU memory;

said MMU receiving a control signal from said CPU for selecting a predetermined one of said contexts when said logical address is provided by said CPU;

said MMU memory for receiving a first portion of said logical address from said CPU and said first portion of said logical address accessing a stored relocation base address of a selected context and corresponding of said limit and access bits;

an adder coupled to said MMU memory for receiving said accessed relocation base address of said selected context and combining it with a second portion of said logical address to output said physical address for accessing said main memory;

said adder also coupled to receive said limit bits corresponding to said accessed relocation base address and adding it to said second portion of said logical address and generating an indication signal if said second portion of said logical address exceeds a value set by said limit bits;

access check logic means coupled to said MMU memory and said adder for receiving said access bits corresponding to said accessed relocation base address and determining if said access bits permit access of said main memory for a type of access requested by said CPU and generating a fault signal to prevent access of said main memory if an illegal access of said main memory is attempted;

said access check logic means also generating said fault signal if said indication signal is received from said adder;

each said relocation base address for pointing to a corresponding mapped base address in said main memory, such that a given logical address is mapped into a plurality of physical addresses, wherein at least one physical address is provided for each context; and wherein selected physical address of said main memory can be accessed by more than one context.

* * * * *